Aug. 10, 1926.
E. J. FETHERSTONHAUGH
INTERNAL COMBUSTION ENGINE
Filed Sept. 26, 1921
1,595,545
5 Sheets-Sheet 1
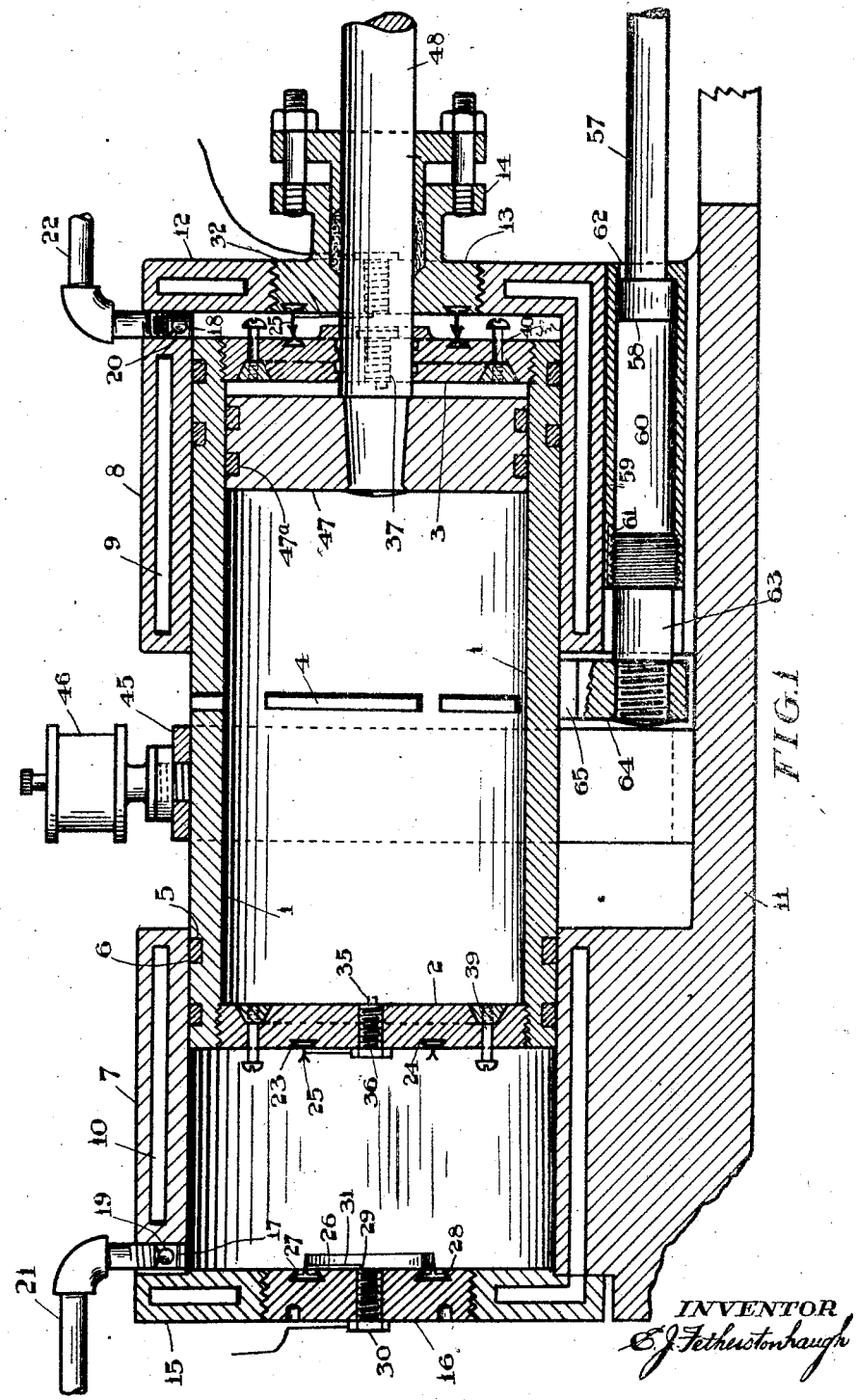
INVENTOR
E.J.Fetherstonhaugh

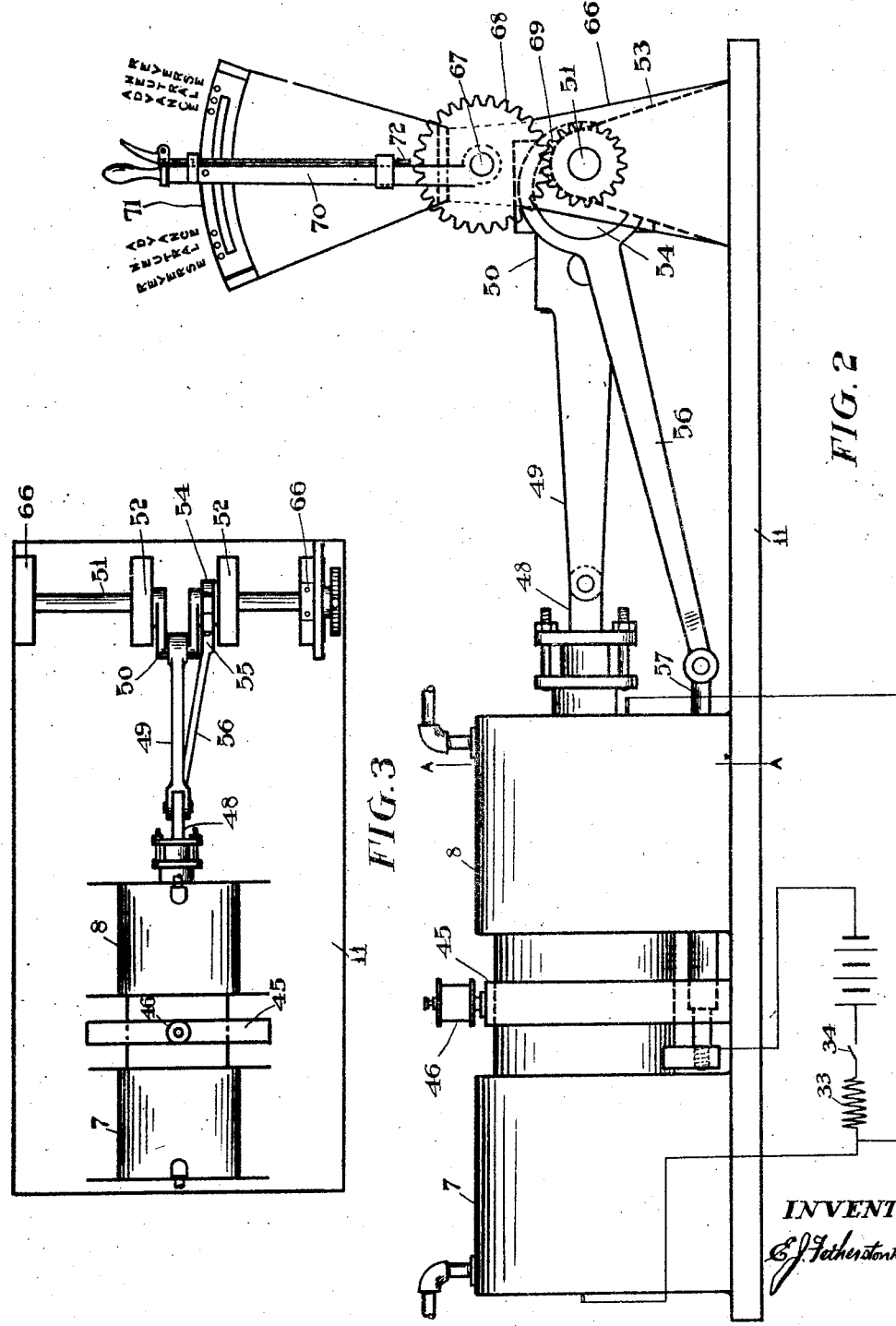

Aug. 10, 1926. 1,595,545
E. J. FETHERSTONHAUGH
INTERNAL COMBUSTION ENGINE
Filed Sept. 26, 1921 5 Sheets-Sheet 3

INVENTOR
E.J.Fetherstonhaugh

Aug. 10, 1926.

E. J. FETHERSTONHAUGH 1,595,545

INTERNAL COMBUSTION ENGINE

Filed Sept. 26, 1921   5 Sheets-Sheet 5

INVENTOR
E. J. Fetherstonhaugh

Patented Aug. 10, 1926.

1,595,545

UNITED STATES PATENT OFFICE.

EDWARD JOHN FETHERSTONHAUGH, OF MONTREAL, QUEBEC, CANADA.

INTERNAL-COMBUSTION ENGINE.

Application filed September 26, 1921. Serial No. 503,436.

The invention relates to internal combustion engines as described in the present specification and illustrated in the accompanying drawings that form part of the same.

The invention consists essentially of the novel features of construction pointed out broadly and specifically in the claims for novelty following a description in detail of the preferred form of the device.

The objects of the invention are to provide an efficient, economical and serviceable engine for the various purposes to which a motor is applied; and to construct capable gasoline engines at a reasonable cost to producer and consumer.

In the drawings Figure 1 is a longitudinal sectional view of the engine.

Figure 2 is a side elevation of the engine including the starting gear.

Figure 3 is a plan view on a reduced scale.

Like numerals of reference indicate corresponding parts in the various figures.

Figure 4:
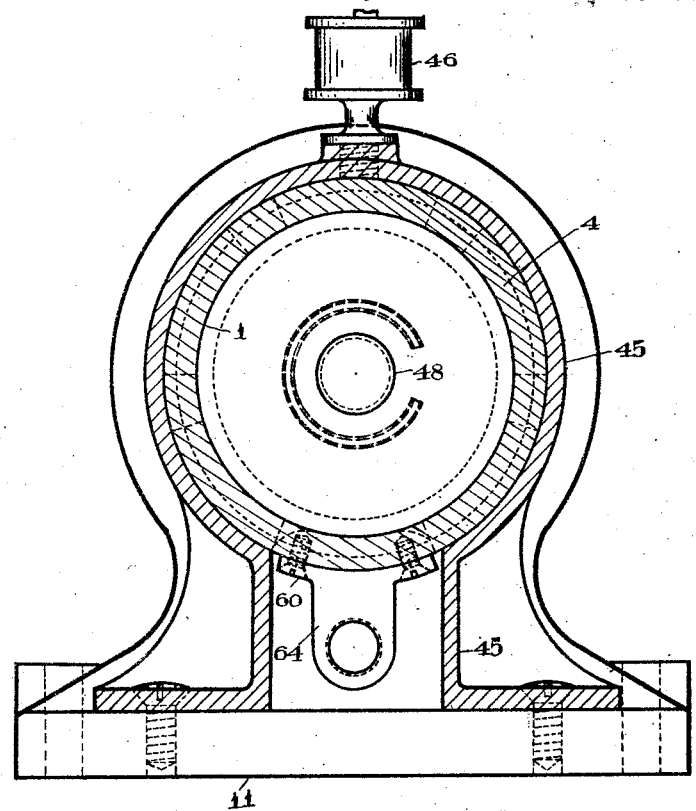
Figure 4 is a cross sectional view on the line A—A in Figure 2.

Referring to the drawings the inner cylinder 1 is closed at the ends by the heads 2 and 3 which are here shown as screw-threaded thereinto though they may be attached in any suitable manner.

Intermediate of the length of the cylinder 1 the circumferential row of exhaust ports 4 extend the major portion of the distance around the cylinder leaving the bottom closed but shelving the metal between the lowest exhaust ports to form a drain from the interior of said cylinder for the egress of condensed gasoline and surplus lubricating oil. The packing ring grooves 5 are filled with the packing rings 6 and slide in the outer cylinders 7 and 8 which have the water jackets 9 and 10 respectively.

The cylinders 7 and 8 form part with or are supported from the base 11 and the cylinder 8 is open at one end and permanently closed by the head 12 at the other end, the head 12 having a central access opening closed by the plug 13 in which the stuffing box 14 surrounds the central rod orifice. The cylinder 7 is open at both ends and the outer end is closed by the head 15 having the central plug 16 closing a central access opening. The gas inlet passages 17 and 18 lead into the cylinders 7 and 8 adjacent to the heads 12 and 15 and contain the check valves 19 and 20 which control the flow of gas from the feed pipes 21 and 22.

The heads 2 and 3 are each formed with the circular recess 23 in the outer side and this recess is lined with the insulator 24 in which the electrical contact member 25 is held said contacts being double plate formation in cross section and flaring outwardly at their ends to complete with the electrical contact 26 knife switches for ignition purposes. The contacts 26 are held in corresponding grooves 27 in the heads 12 and 15 in the inner sides and suitably insulated in said grooves by the insulation 28 and connected with the plugs 29 and the plugs 30 which are screw threaded into the heads 12 and 15 and insulate the wires 31 and 32, each of the latter being connected through an ignition coil 33 Figure 2 to a battery or other source of electrical energy, the switch 34 controlling the feed to the electric circuit, one wire of which is grounded in the engine.

The contacts 25 are electrically connected to the ignition wires 35, which extend through the heads 2 and 3 within the plugs 36 and 37, one in each head, the other ignition wire 38 in each head being secured to the metal of the plugs 36 and 37 while the wires 35 are each insulated within said plugs 36 and 37.

Figure 5:
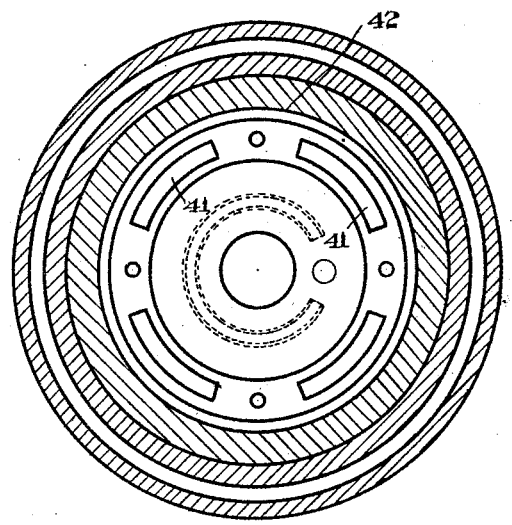
Figure 5 is a cross sectional view of the inner cylinder through a head.
Figure 6:
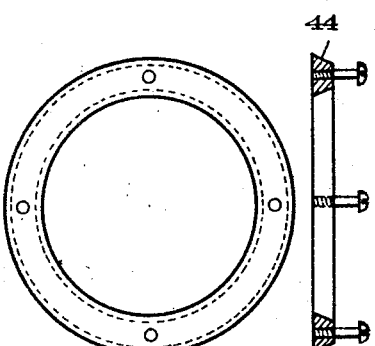
Figure 6 is a plan view of a check valve on a reduced scale.
Figure 7:
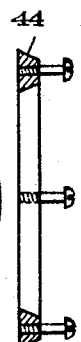
Figure 7 is a cross sectional view of a check valve on a reduced scale.
Figure 8:
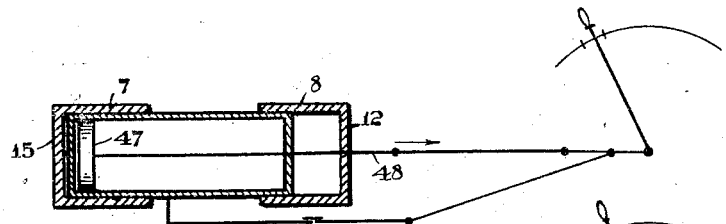
Figure 8 is a diagrammatic view of the cylinders, piston and connecting rods showing the cranks at dead centre.
Figure 9:
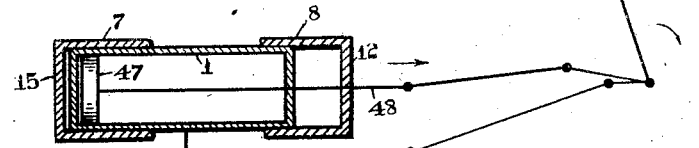
Figure 9 is a diagrammatic view showing the crank off the dead centre for rotation in one direction.
Figure 10:
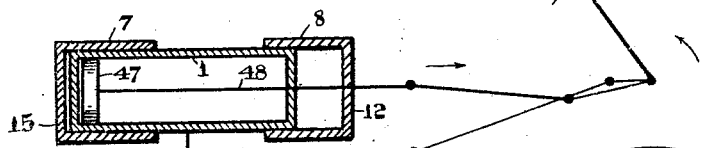
Figure 10 shows the crank in position for the other direction of rotation.
Figure 11:
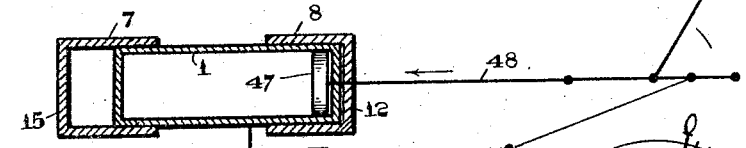
Figure 11 shows the piston at the other end of the cylinder and the cranks at dead centre.
Figure 12:
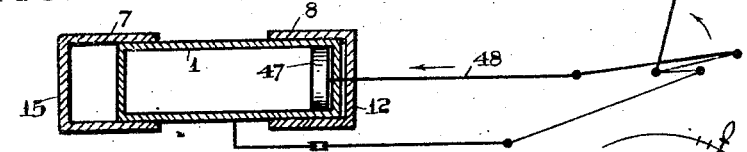
Figure 12 shows the off centre position of the crank for one direction of rotation in the arrangement illustrated in Figure 11.
Figure 13:
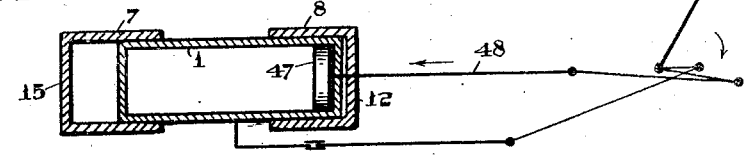
Figure 13 shows the off centre position for the other direction of rotation in the arrangement illustrated in Figures 11 and 12.
Figures 14, 15:
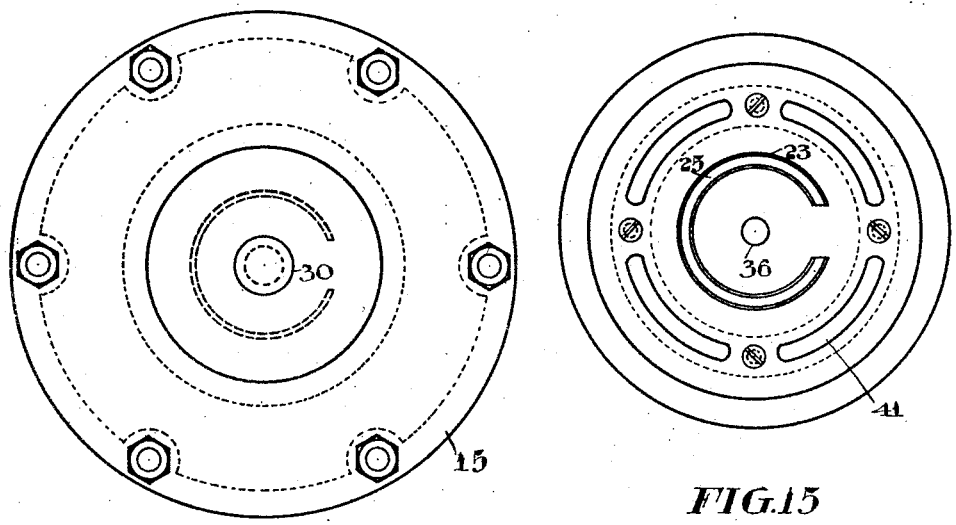
Figure 14 is a plan view of an outer cylinder head.
Figure 15 is a plan view of an inner cylinder head.
Figure 18:
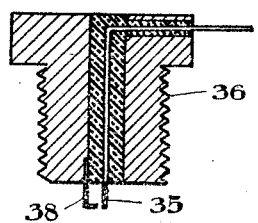
Figure 18 is a detail of a spark plug.
Figure 16:
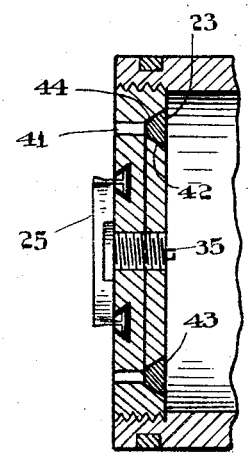
Figure 16 is a cross sectional view of an inner cylinder head.
Figure 17:
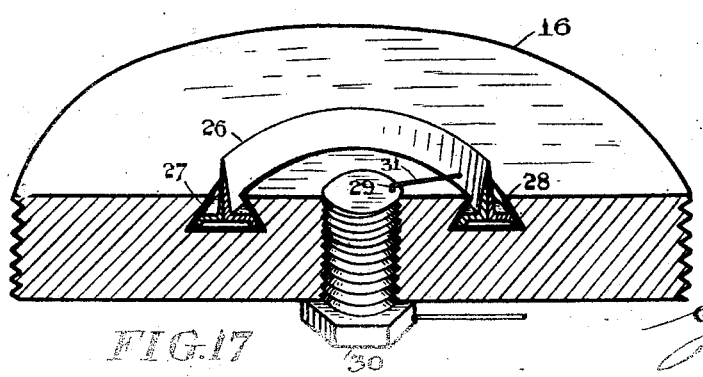
Figure 17 is a cross sectional view of the central plug in an outer cylinder head.

Surrounding the recesses 23 the annular ports 39 and 40 form the gas inlets to the cylinder 1 and these ports have the arc shaped outlets 41 Figure 5 and the uninterrupted inner tapered walls 42 which form ground seats for the ring valves 43 Figure 16, said valves 43 having correspondingly tapered ground faces 44 fitting to the seats 42 Figure 5 and held in place by the pins sliding in pin holes in the heads 2 and 3 between the outlets 41.

The central stationary valve sleeve 45 Figures 1 and 4 is rigidly secured to the base 11 and partially encircles the inner cylinder 1 and covers the exhaust ports 4 in certain positions of the said inner cylinder 1 and at the same time forms a central guide for said cylinder 1 besides carrying the oil cup 46 which feeds oil to the inner cylinder 1, both outside and inside.

The piston 47 reciprocates within the cylinder 1 and has the packing rings 47$^a$ in suitable grooves. The rod 48 extends outwardly from said piston 47 through the stuffing box 14 and without is pivotally joined to the connecting rod 49 Figures 2 and 3 which is pivotally mounted on the crank 50 turning the crank shaft 51, the latter being journalled in the bearings 52 supported on the extension 53 from the base 11.

The eccentric 54 is fixedly mounted on the shaft 51 and the eccentric strap 55 encloses said eccentric and from this strap the rod 56 extends and at its end is pivotally connected with the plunger rod 57. The plunger rod 57 extends from a plunger 58 which operates in an air cylinder 59 reciprocating in a cylindrical recess 60 under the cylinder 8 said cylinder 59 having air holes 61 and 62 through the ends respectively, thus said plunger 58 and air cylinder 59 together form a cushioned slip joint.

The rod 63 secured to the inner end of the cylinders 59 is secured to the lug 64 which projects from the flanges 65, the latter being rigidly secured to the bottom of the inner cylinder 1 centrally and between the lowermost exhaust ports 4 thereby providing a mechanical means of moving the said cylinder 1 coincidently with the rotation of the crank shaft 51.

The bearings 66 are supported on the base 11 and the auxiliary shaft 67 is journalled in said bearings 66 and carries the gear 68 which coacts with the pinion 69 on the crank shaft 51.

The lever 70 held and sliding in the slotted quadrant 71 is pivoted on the shaft 67 and has attached thereto the spring latch 72 which is spring held from engagement with the gear 68 being proportioned in relation to the pinion 69 to turn the crank shaft 51 a shade under a complete half turn according with the length of the slot in the quadrant 71 as explained more fully in describing the operation.

In the operation of the invention the inner cylinder 1 forms a reciprocating combustion chamber at each end as following the explosion at one end the chamber follows up the piston and similarly at the other end.

The inner cylinder travels approximately one half the distance of travel of the piston which transverses the full length the inner cylinder in the interior, therefore the inner cylinder must wait for the piston to reach half the distance between the outer cylinder heads before starting. To do this there are more ways than one, but a simple means is here shown in the slip joint which permits the eccentric a part revolution before the inner cylinder is affected and then carries it along quickly after the piston, meanwhile the exhaust ports have been covered by the central sleeve and when the inner cylinder follows they uncover and the exploded gases find egress.

The movement of the inner cylinder draws gas in through the inlet to the outer cylinder as the ball is only seated on pressure from within, otherwise the inlet is quite open with only a cage or other support to keep the ball in place, but any suitable inlet valve may be used as this is not an essential feature in the invention. On the return stroke of the piston and inner cylinder this gas is compressed and forces its way through the annular inlet ports 39 and 40 in the head of the inner cylinder where it is finally compressed by the returning piston and as the inner cylinder reaches a point close to the head of the outer cylinder the electrical contacts come together and a consequent spark occurs, which ignites the compressed gases and projects the piston to the other end of the inner cylinder where the same thing occurs thus sending the piston and inner cylinder forwardly and backwardly and furthering the object of the invention.

In starting the engine the starting lever is moved in the slot of the quadrant and by means of the gear the crank shaft is turned nearly one half of a revolution. The lever is moved quickly to one end and back which sucks and compresses gas. The termination of the slot limits the travel of the inner cylinder so as to throw the crank slightly off the dead centre according to the direction of rotation required. The ignition is then performed and the engine started. The diagrammatical figures thoroughly explain this starting device by illustration.

What I claim is:

1. In an internal combustion engine, a pair of outer casings spaced apart and having open opposing ends, a cylinder having exhaust openings and inlet ports in the heads thereof and inserted in said casings and reciprocable therein, a fluid operated piston in said cylinder and a rod projecting therefrom, means for igniting the charge of fluid at either end of the cylinder and coacting means at either end of the casings, and a cylinder operating gear secured to said cylinder and operated through said rod and having a slip mechanism for timing the movement of said cylinder in following said piston.

2. In an internal combustion engine, a pair of outer casings spaced apart and each having a water jacket, and of said casings having a rod orifice and a stuffing box, a cylinder having exhaust openings and inlet ports in the heads thereof and a fluid operated piston in said cylinder and a rod projecting therefrom, means for igniting the charge of fluid at either end of the cylinder and coacting means at either end of the casings, and a cylinder operating gear secured to said cylinder and operated through said rod and having a slip mechanism for timing the movement of said cylinder in following said piston.

3. In an internal combustion engine, a pair of outer casings spaced apart and each having a water jacket, one of said casings having a central plug closing a central access opening, a cylinder having exhaust openings and inlet ports in the heads thereof and inserted in said casings and reciprocable therein, a fluid operated piston in said cylinder and a rod projecting therefrom, means for igniting the charge of fluid at either end of the cylinder and coacting means at either end of the casings, and a cylinder operating gear secured to said cylinder and operated through said rod and having a slip mechanism for timing the movement of said cylinder in following said piston.

4. In an internal combustion engine, a pair of outer casings spaced apart and having open opposing ends, a cylinder projecting into said casings and reciprocating therein and forming suction chambers within said outer casings, a fluid operated piston in said cylinder and a rod projecting therefrom, means for igniting the charge of fluid at either end of the cylinder and coacting means at either end of the casings, and a cylinder operating gear secured to said cylinder and operated through said rod and having a slip mechanism for timing the movement of said cylinder in following said piston.

5. In an internal combustion engine, a pair of water casings spaced apart and having open opposing ends, a cylinder at either end and projecting into said casings and reciprocating therein and therebetween, a fluid operated piston in said cylinder and a rod projecting therefrom, means for igniting the charge of fluid at either end of the cylinder and coacting means at either end of the casings, and a cylinder operating gear secured to said cylinder and operated through said rod and having a slip mechanism for timing the movement of said cylinder in following said piston.

6. In an internal combustion engine, a pair of outer casings spaced apart and having open opposing ends, a cylinder aligning said casings and reciprocating therein and forming an explosive area at each end, a fluid operated piston in said cylinder and a rod projecting therefrom, means for igniting the charge of fluid at either end of the cylinder and coacting means at either end of the casings, and a cylinder operating gear secured to said cylinder and operated through said rod and having a slip mechanism for timing the movement of said cylinder in following said piston.

7. In an internal combustion engine, a pair of outer casings spaced apart and having open opposing ends, a cylinder closed at the ends and having inlets in the heads and suitable exhaust opening in the wall thereof and projecting into said casings and in operation reciprocating therein, a fluid operated piston in said cylinder and a rod projecting therefrom, means for igniting the charge of fluid at either end of the cylinder and coacting means at either end of the casings, and a cylinder operating gear secured to said cylinder and operated through said rod and having a slip mechanism for timing the movement of said cylinder in following said piston.

8. In an internal combustion engine, a pair of outer casings, spaced apart and having open opposing ends, a cylinder having removable heads and an annular valve seat formed in the inner sides and an exhaust opening, said cylinder reciprocating in said casings, a fluid operated piston in said cylinders and a rod projecting therefrom, means for igniting the charge of fluid at either end of the cylinder and coacting means at either end of the casings, and a cylinder operating gear secured to said cylinder and operated through said rod and having a slip mechanism for timing the movement of said cylinder in following said piston.

9. In an internal combustion engine, a pair of outer casings spaced apart and having open opposing ends, a cylinder having exhaust openings and inlet ports in the heads thereof and inserted in said casing and reciprocable therein, a fluid operated piston reciprocatively arranged in said cylinder and adapted to start in advance of said cylinder and following to the finish of the stroke and having a rod projecting therefrom, means for igniting the charge of fluid at either end of the cylinder and coacting means at either end of the casings, and a cylinder operating gear secured to said cylinder and operated through said rod and having a slip mechanism for timing the movement of said cylinder in following said piston.

10. In an internal combustion engine, a pair of outer casings spaced apart and having open opposing ends, a cylinder having exhaust openings and inlet ports in the heads thereof and inserted in said casings and reciprocable therein, a fluid operated piston connected to said cylinder and in operation reciprocating therewithin and forming with the heads and wall thereof explosion chambers shiftable with said ports at each stroke, and a rod projecting from said piston, means for igniting the charge of fluid at either of the cylinders and coacting means at either end of the casings, and a cylinder operating gear secured to said cylinder and operated through said rod and having a slip mechanism for timing the movement of said cylinder in following said piston.

11. In an internal combustion engine, a pair of outer casings spaced apart and having open opposing ends, a cylinder having exhaust openings and inlet ports in the heads thereof and inserted in said casings and reciprocable therein, a fluid operated piston in said cylinder, a rod projecting from said piston and passing through the head of one of said outer casings and operatively connected with a crank shaft, means for igniting the charge of fluid at either end of the cylinder and coacting means at either end of the casings, and a cylinder operating gear secured to said cylinder and operated through said rod and having a slip mechanism for timing the movement of said cylinder in following said piston.

12. In an internal combustion engine, a pair of outer casings spaced apart and having open opposing ends, a cylinder having exhaust openings and inlet ports in the heads thereof and inserted in said casings and reciprocable therein, a fluid operated piston in said cylinder and a rod projecting therefrom, means for igniting the charge of fluid at either end of the cylinder and coacting means at either end of the casings and a cylinder operating gear secured to said cylinder and operated through said rod and having a rod gear in sectional lengths having a slotted member forming a slip connection and connected at one end to the cylinder and the other end to a crank shaft.

13. In an internal combustion engine, a pair of outer casings spaced apart and having open opposing ends, a cylinder having exhaust opening and inlet ports in the heads thereof and inserted in said casings and reciprocable therein, a fluid operated piston in said cylinder and a rod projecting therefrom and pivotally connected with a crank shaft, and an eccentric operatively connected to said cylinder and arranged to operate the latter following the movement of said piston, means for igniting the charge of fluid at either end of the casings, and a cylinder operating gear secured to said cylinder and operated through said rod and having a slip mechanism for timing the movement of said cylinder in following said piston.

14. In an internal combustion engine, a pair of outer casings spaced apart and having open opposing ends, a cylinder having exhaust opening and inlet ports in the heads thereof and inserted in said casings and reciprocable therein, a fluid operated piston in said cylinder and a rod projecting therefrom, an operating lever and setting gear for adjusting said piston in relation to said cylinder for its initial movement, means for igniting the charge of fluid at either end of the casings, and a cylinder operating gear secured to said cylinder and operated through said rod and having a slip mechanism for timing the movement of said cylinder in following said piston.

15. In an internal combustion engine, an outer casing rigidly mounted and having water jacket and inlets thereto, a reciprocating cylinder within said casing having head inlet and body exhaust openings, a fluid operated piston operating in said inner cylinder and having a rod therefrom projecting a cylinder head and a casing head, a mechanical rod gear operatively connected with the piston and secured to the cylinder through a slip connection, lever means for operating said piston and incidentally said mechanical rod gear independently of an explosion, and means for igniting the fluid.

Signed at Montreal, Canada, this 21st day of September, 1921.

EDWARD JOHN FETHERSTONHAUGH.